United States Patent
Cho et al.

(10) Patent No.: US 12,170,843 B2
(45) Date of Patent: Dec. 17, 2024

(54) APPARATUS AND METHOD FOR PHOTOGRAPHING OBJECT

(71) Applicant: Mintit Co., Ltd., Gyeonggi-do (KR)

(72) Inventors: Sung Lack Cho, Seoul (KR); Hang Seok Choi, Seoul (KR)

(73) Assignee: Mintit Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/018,598

(22) PCT Filed: Feb. 23, 2021

(86) PCT No.: PCT/KR2021/002246
§ 371 (c)(1),
(2) Date: Jan. 30, 2023

(87) PCT Pub. No.: WO2022/045499
PCT Pub. Date: Mar. 3, 2022

(65) Prior Publication Data
US 2023/0308751 A1  Sep. 28, 2023

(30) Foreign Application Priority Data
Aug. 24, 2020  (KR) .................. 10-2020-0106306

(51) Int. Cl.
*H04N 23/667* (2023.01)
*H04N 23/56* (2023.01)
(Continued)

(52) U.S. Cl.
CPC .......... *H04N 23/667* (2023.01); *H04N 23/56* (2023.01); *H04N 23/61* (2023.01); *H04N 23/62* (2023.01); *H04N 23/631* (2023.01)

(58) Field of Classification Search
CPC ...... H04N 23/667; H04N 23/56; H04N 23/61; H04N 23/62; H04N 23/631; H04N 23/611; H04N 23/72; H04N 23/74; G06V 10/141
See application file for complete search history.

(56) References Cited

U.S. PATENT DOCUMENTS

| | | | |
|---|---|---|---|
| 2010/0097515 A1 | 4/2010 | Ishii | |
| 2013/0208005 A1* | 8/2013 | Kasahara | G06T 19/006 345/633 |

(Continued)

FOREIGN PATENT DOCUMENTS

| | | |
|---|---|---|
| JP | H0659305 A | 3/1994 |
| JP | H08220586 A | 8/1996 |

(Continued)

*Primary Examiner* — Kelly L Jerabek
(74) *Attorney, Agent, or Firm* — Downs Rachlin Martin PLLC

(57) ABSTRACT

An apparatus and a method for photographing an object are disclosed. According to an embodiment, a first button corresponding to a first mode and a second button corresponding to a second mode are exposed on a display, and when a user input for selection of the first button occurs, at least one camera is controlled to obtain a first image of the object; one of a plurality of photographing modes is selected as a photographing mode for the object through a result of object recognition based on the obtained first image; and one or more second images of the object are obtained by controlling the at least one camera and at least one lighting on the basis of the selected photographing mode.

16 Claims, 4 Drawing Sheets

(51) Int. Cl.
    *H04N 23/61*     (2023.01)
    *H04N 23/62*     (2023.01)
    *H04N 23/63*     (2023.01)

(56) References Cited

U.S. PATENT DOCUMENTS

| | | | | |
|---|---|---|---|---|
| 2014/0267626 A1* | 9/2014 | Lilagan | ............... | A61B 1/00193 |
| | | | | 348/46 |
| 2015/0077574 A1* | 3/2015 | Jayaraj | ................. | H04N 23/632 |
| | | | | 348/333.01 |
| 2020/0400586 A1* | 12/2020 | Reynaud | ................ | G06V 20/95 |

FOREIGN PATENT DOCUMENTS

| | | | |
|---|---|---|---|
| JP | 2000029099 | A | 1/2000 |
| JP | 2001330882 | A | 11/2001 |
| JP | 2008134835 | A | 6/2008 |
| JP | 6548288 | B1 | 7/2019 |
| KR | 20160095870 | A | 8/2016 |
| KR | 20200069853 | A | 6/2020 |
| WO | 2019183775 | A1 | 10/2019 |

\* cited by examiner

| | Camera position | Capture option | Light intensity | Wavelength | ... |
|---|---|---|---|---|---|
| Object #1 | Position information$_1$ | Option$_1$ | Intensity$_1$ | Wavelength$_1$ | ... |
| Object #2 | Position information$_2$ | Option$_2$ | Intensity$_2$ | Wavelength$_2$ | ... |
| ⋮ | ⋮ | ⋮ | ⋮ | ⋮ | ⋮ |

APPARATUS AND METHOD FOR PHOTOGRAPHING OBJECT

TECHNICAL FIELD

The following example embodiments relate to a method and apparatus for capturing an object.

BACKGROUND ART

A seller may post an image that captures an object on a trading website to sell the object. However, a characteristic of a selling product may not be expressed well in the image.

As a related prior art, there is Korean Patent Application No. 2020-0069853 (Title of Invention: automated uploading method and system for shopping for mall products, Applicant: Heonjong Park). In the patent application, disclosed are an automated uploading method and a system for shopping for mall products, which may rapidly and automatically produce a detailed page for introducing a product of a shopping mall by capturing the product and editing.

The above description is information the inventor(s) acquired during the course of conceiving the present disclosure, or already possessed at the time, and is not necessarily art publicly known before the present application was filed.

DISCLOSURE OF THE INVENTION

Technical Solutions

In one general aspect, an object capturing device includes a capturing box in which at least one camera and at least one lighting device are provided and an object is placed, a display, and a controller configured to expose a first button corresponding to a first mode and a second button corresponding to a second mode on the display, in response to a user's selection input for the first button, obtain a first image of the object by controlling the at least one camera, select a capture mode for the object from a plurality of capture modes through an object recognition result based on the obtained first image, obtain at least one second image of the object by controlling the at least one camera and the at least one lighting device based on the selected capture mode.

The first mode represents a mode that determines a capture mode based on object recognition, and the second mode represents a mode that determines a capture mode based on user input information.

The selected capture mode includes camera position information, a capture option, a light intensity, and wavelength information.

The controller is configured to move a camera for capturing the object based on the camera position information, set a capture option of the camera for capturing the object based on the capture option, and control a lighting device for capturing the object to output light of the wavelength information with the light intensity.

The capture option includes at least one of a shutter speed, an aperture size, sensitivity, auto-focusing, zoom, and white balance.

The capture option, the light intensity, and the wavelength information are related to a characteristic of the object.

The object recognition result corresponds to a result of performing object recognition on the obtained first image by an object recognition model or corresponds to an object recognized based on a matching rate between the obtained first image and each of prestored images in a database. Depending on cases, when an image that matches the obtained first image is not stored in the database, when the object recognition model does not view the obtained first image, and when the object does not belong to any classification in a second mode that is described below, object recognition may fail. In other words, the obtained first image is an image capturing a new object that is not registered. In this case, the controller or a server may obtain information, such as the shape, size, color distribution, color temperature, reflectivity, and the like of the object, through the obtained first image and may recommend an optimal capture option based on the obtained information. The controller may obtain at least one second image of the object by controlling at least one camera and at least one lighting device based on the recommended capture option.

The controller is configured to, when object recognition based on the obtained first image fails, switch from the first mode to the second mode, and expose a user interface on the display to receive information of the object from the user in the second mode.

The controller is configured to perform post-processing on the obtained at least one second image and post the at least one post-processed second image on a predetermined online website.

In another aspect, an object capturing method includes exposing a first button corresponding to a first mode and a second button corresponding to a second mode on the display, in response to a user's selection input for the first button, obtaining a first image of the object by controlling at least one camera, selecting a capture mode for the object from a plurality of capture modes through an object recognition result based on the obtained first image, and obtaining at least one second image of the object by controlling the at least one camera and at least one lighting device based on the selected capture mode.

The first mode represents a mode that determines a capture mode based on object recognition, and the second mode represents a mode that determines a capture mode based on user input information.

The selected capture mode includes camera position information, a capture option, a light intensity, and wavelength information.

The obtaining of the second image includes moving a camera for capturing the object based on the camera position information, setting a capture option of the camera for capturing the object based on the capture option, and controlling a lighting device for capturing the object to output light of the wavelength information with the light intensity.

The capture option includes at least one of a shutter speed, an aperture size, sensitivity, auto-focusing, zoom, and white balance.

The capture option, the light intensity, and the wavelength information are related to a characteristic of the object.

The object recognition result corresponds to a result of performing object recognition on the obtained first image by an object recognition model or corresponds to an object recognized based on a matching rate between the obtained first image and each of prestored images.

The object capturing method further includes, when object recognition based on the obtained first image fails, switching from the first mode to the second mode, and exposing a user interface on the display to receive information of the object from the user in the second mode.

The object capturing method further includes performing post-processing on the obtained at least one second image and posting the at least one post-processed second image on a predetermined online website.

Effects

Example embodiments may automatically capture an object based on a characteristic of the object and may automatically process a captured image and register the captured image on an online website.

In addition, example embodiments may improve user convenience by providing a convenient service from capturing to posting to a user who desires to sell an object.

BEST MODE FOR CARRYING OUT THE INVENTION

Figure 1:
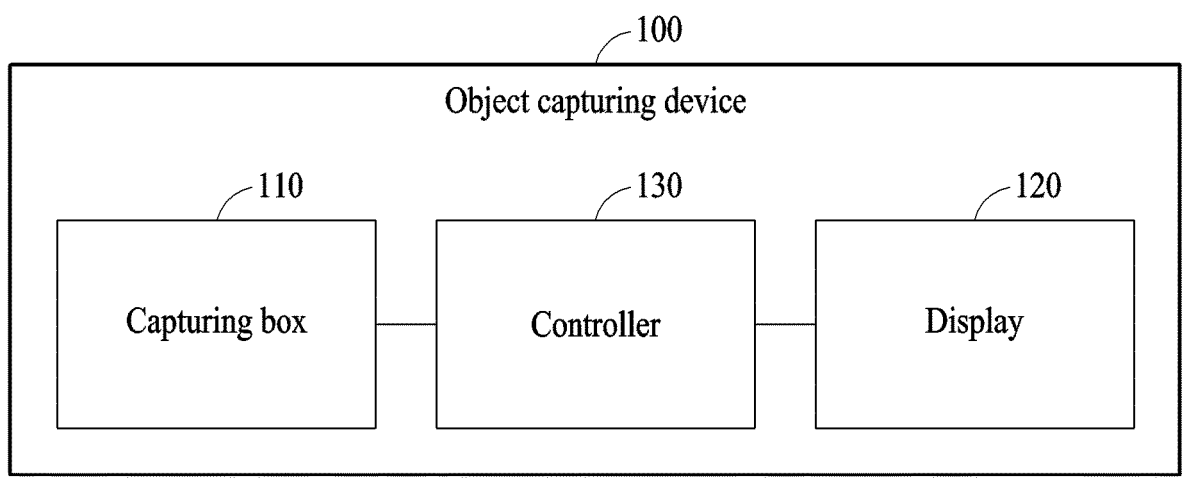
FIG. 1 is a block diagram illustrating an object capturing device according to an to example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 is a block diagram illustrating an object capturing device according to an example embodiment.

Referring to FIG. 1, an object capturing device 100 according to an example embodiment may include a capturing box 110, a display 120, and a controller 130. The capturing box 110 may include at least one lighting device and at least one camera. The at least one camera may be fixed in the capturing box 110. Depending on implementation, the at least one camera in the capturing box 110 may move under control by the controller 130.

An object may be placed in the capturing box 110. The object may be a tangible object or item and may include, for example, an electronic device, daily supplies, and the like. However, the example is not limited thereto. The object capturing device 100 may include a door that is able to be opened or closed. When the door is open, a user may place an object in the capturing box 110. After the door is opened, an inquiry about whether placing an object is completed may be displayed on the display 120. When the user enters a completion response to the display 120 or a predetermined time has elapsed after the door is opened, the door may be closed.

The controller 130 may expose a first button corresponding to a first mode and a second button corresponding to a second mode on the display 120. In this case, the first mode may represent a mode for determining a capturing mode for an object based on object recognition and the second mode may represent a mode for determining a capture mode for an object based on user input information.

When there is a selection input of the user for the first button corresponding to the first mode, the controller 130 may obtain a first image for an object by controlling the at least one camera. For example, when the user selects the first button on the display 120, the controller 130 may apply a capture signal to a predetermined camera and the predetermined camera may capture an object based on the capture signal. Accordingly, the controller 130 may obtain the first image of the object by using the predetermined camera.

The controller 130 may select a capture mode for the object from a plurality of capture modes through an object recognition result based on the obtained first image. The selected capture mode may include, for example, camera position information, a capture option, a light intensity, and wavelength information. The capture option may include, for example, at least one of a shutter speed, an aperture size, sensitivity, auto-focusing, zoom, and white balance. However, this is only an example, and the capture option is not limited thereto. The capture option, the light intensity, and the wavelength information may be related to a characteristic (e.g., the size, color, material, and the like) of the object.

According to an example embodiment, the object recognition result may correspond to a result of performing object recognition on the first image by an object recognition model. In this case, the object recognition model may be trained artificial intelligence (or a trained neural network model). Alternatively, the object recognition result may be obtained by recognizing based on a matching rate between the obtained first image and each prestored image. Object recognition is described with reference to FIGS. 3 to 4B.

The controller 130 may obtain at least one second image of the object by controlling the at least one camera and the at least one lighting device based on the selected capture mode. For example, the controller 130 may move a camera for capturing an object based on camera position information and may set a capture option of the camera for capturing the object based on the capture option. In addition, the controller 130 may control a lighting device used for capturing the object to output light with the light intensity and the wavelength information.

The controller 130 may perform post-processing on the obtained at least one second image.

The controller 130 may post the post-processed at least one second image on a predetermined online website. According to an example embodiment, the controller may store the post-processed at least one second image, and then may post on the predetermined online website.

The object capturing device 100 according to an example embodiment may automatically capture an object based on a characteristic of the object (e.g., the size, color, material, and the like) and may register the captured image on an online website (e.g., a shopping mall, a second-hand shopping mall, a second-hand trading website) by automatically processing the captured image. Accordingly, the object capturing device may provide a convenient service from capturing to posting to a user who desires to sell an object.

Figure 2:
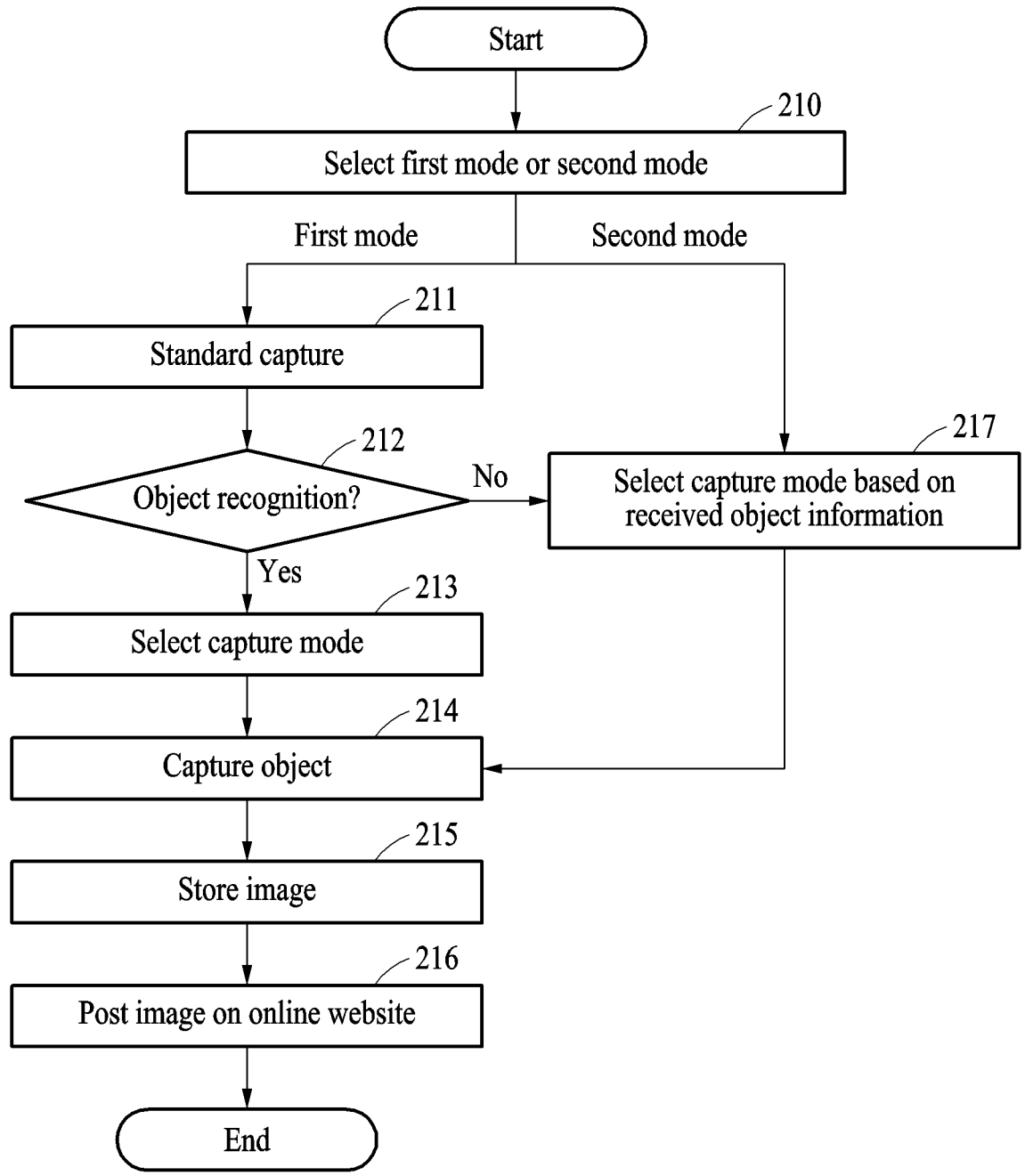
FIGS. 2 to 5 are diagrams illustrating an object capturing method according to an example embodiment.

FIG. 2 is a flowchart illustrating an object capturing method according to an example embodiment.

Referring to FIG. 2, in operation 210, the object capturing device 100 may select a first mode or a second mode. In operation 210, the controller 130 may expose a first button corresponding to the first mode and a second button corresponding to the second button on the display 120. When a user presses the first button exposed on the display 120, the controller 130 may select the first mode and when the user presses the second button exposed on the display 120, the controller 130 may select the second mode. In operation 217, when the second mode is selected, the object capturing device 100 may select a capture mode based on received object information. In operation 217, when the second mode is selected, the controller 130 may expose, on the display 130, a user interface to receive object information, may specify the object by receiving the object information through the exposed user interface, and may select a capture mode based on the specified object.

For example, when the second mode is selected, the controller 130 may display a large category menu on the display 130. The large category menu may include an electronic device, daily supplies, and the like. When a user selects one (e.g., an electronic device) from the large category menu, the controller 130 may display a middle category menu on the display 130. For example, the middle category menu of the electronic device may include types of electronic devices, such as a smartphone, a laptop, and the like. When the user selects one (e.g., a smartphone) from the middle category menu, the controller 130 may display a small category menu on the display 130. For example, the small category menu of the smartphone may include various smartphone manufacturers. When the user selects one (e.g., xx electronics company) from the small category menu, the controller 130 may display an option menu on the display 130. The option menu of xx electronics company may include names (e.g., Galaxy xx) and colors of smartphones that have been sold and/or are currently sold by xx electronics company. The user may select smartphone A that matches or is similar to the user's object from the option menu and the controller 130 may specify that the object is smartphone A based on the selection. The controller 130 may select a capture mode suitable for smartphone A.

The description of four depths of the large category menu—the middle category menu—the small category menu—the option menu provided above is an example, and the depth of the category in the second mode may vary depending on an object (or an item). Depending on the object (or the item), one depth of a large category menu may exist, two depths of a large category menu—a middle category menu may exist, three depths of a large category menu—a middle category menu—a small category menu may exist, and five depths of a large category menu—a middle category menu—a small category menu—an option menu—a sub option menu may exist.

In another example, the controller 130 may expose, on the display 130, a user interface to receive product information of the object. The product information of the object may include, for example, a serial number, a model name, a name of the object, but is not limited thereto. When the controller 130 receives the product information of the object, the controller 130 may specify the object based on the received product information and may select a capture mode suitable for the object. Alternatively, the controller 130 may classify the object by receiving a serial number of the object or a name of the object through an interface, such as a two-dimensional (2D) barcode reader, a three-dimensional (3D) barcode reader, a camera, a scanner, and the like, and may select a capture mode suitable for the object based on the classification result. Alternatively, the controller 130 may move to a predetermined depth after receiving the serial number of the object or the name of the object and then may control the user to select a category of the next depth (or a sub depth). For example, the controller 130 may classify the object up to the middle category and display the small category menu on the display, and may make the user to select from the small category menu.

In operation 211, when the first mode is selected, the object capturing device 100 may perform standard capture. In operation 211, the controller 130 may obtain a first image of the object placed in the capturing box 110 by using at least one camera. According to an example embodiment, the control 130 may control at least one lighting device to obtain the first image of the object.

In operation 212, the object capturing device 100 may determine whether the object is recognized.

Figure 3:
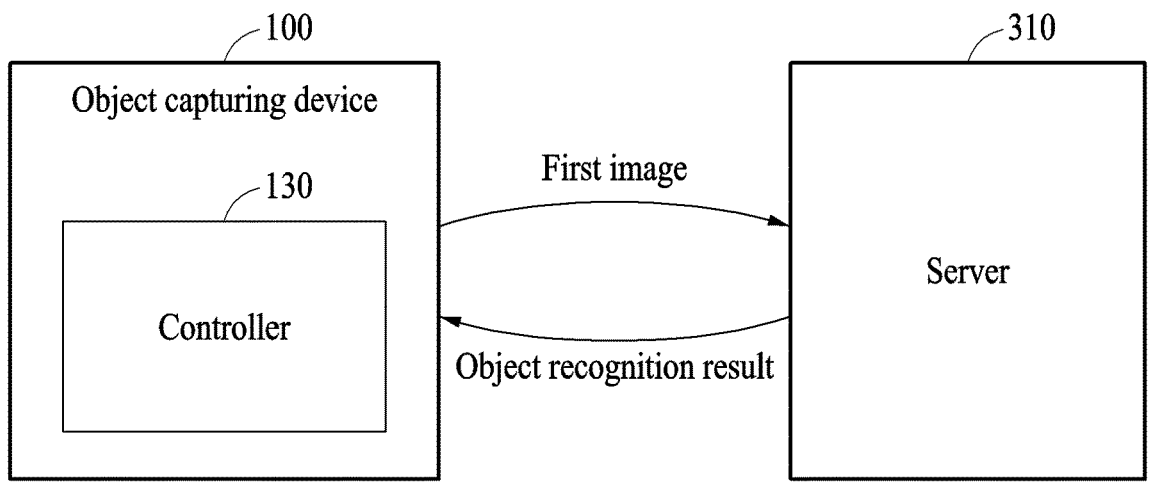

For example, as illustrated in FIG. 3, the object capturing device 100 may transmit the first image to a server 310. An object recognition model in the server 310 may perform object recognition on the first image and may transmit an object recognition result to the object capturing device 100. Alternatively, the server 310 may calculate a matching rate between the first image and each of various images stored in a database, may recognize the object based on the calculated matching rate, and may transmit the object recognition result to the object capturing device 100. For example, when a matching rate between the first image and an image of smartphone A having a specific color is the highest, the server 310 may transmit an object recognition result that "the object is smartphone A having a specific color and a specific material" to the object capturing device 100. In some cases, the object recognition model may not recognize the object in the first image. In other words, the object recognition model may fail to recognize the object from the first image. In this case, the object recognition model may be trained with the first image.

Figure 4A:
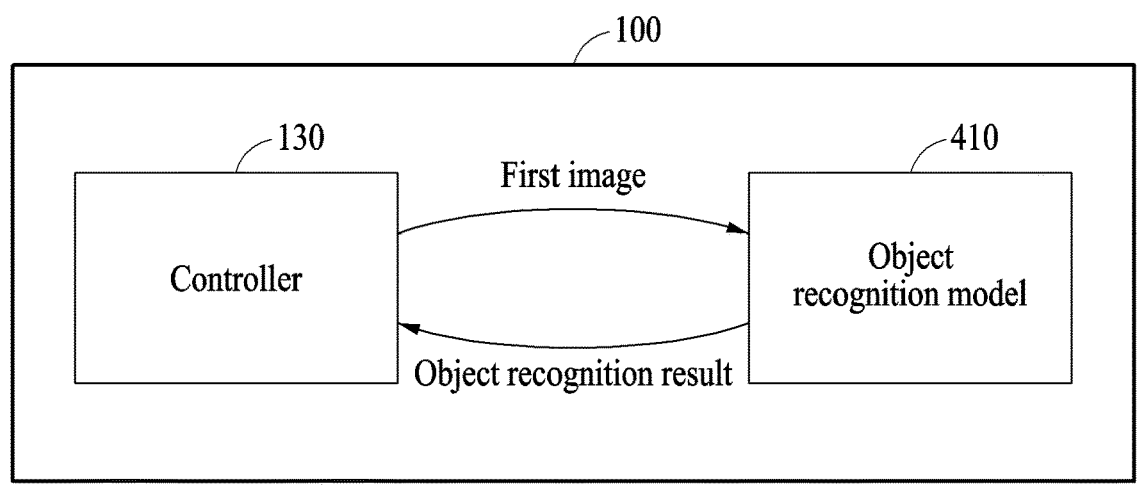
Figure 4B:
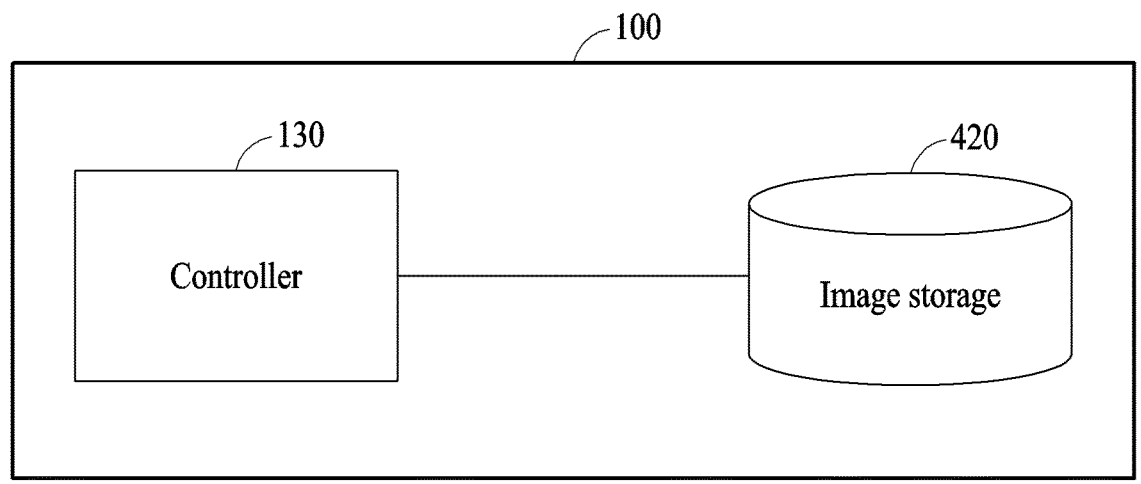

In another example, as illustrated in FIG. 4A, the object capturing device 100 may include an object recognition model 410 or as illustrated in FIG. 4B, the object capturing device 100 may include an image storage 420 that stores various images. As illustrated in FIG. 4A, the controller 130 may input the first image to the object recognition model 410 and may receive the object recognition result from the object recognition model 410. FIG. 4A illustrates an example that the object recognition model is provided outside the controller 130. However, this is only an example, and the object recognition model 410 may be provided inside the controller 130 depending on implementation. As illustrated FIG. 4B, the controller 130 may calculate a matching rate between the first image and each of images in the image storage 420 and may recognize the object based on the calculated matching rates.

Referring to FIG. 2, when the object is not recognized, the object capturing device 100 may switch from the first mode to the second mode and may perform operation 217. For example, when object recognition based on the first image fails, the controller may switch from the first mode to the second mode and may expose, on the display 120, a user interface to receive information of the object in the second mode. In operation 213, when the object is recognized, the object capturing device 100 may select a capture mode suitable for the recognized object. In operation 213, the controller may select a capture mode suitable for the recognized object from a plurality of capture modes.

Figures 5, 6:
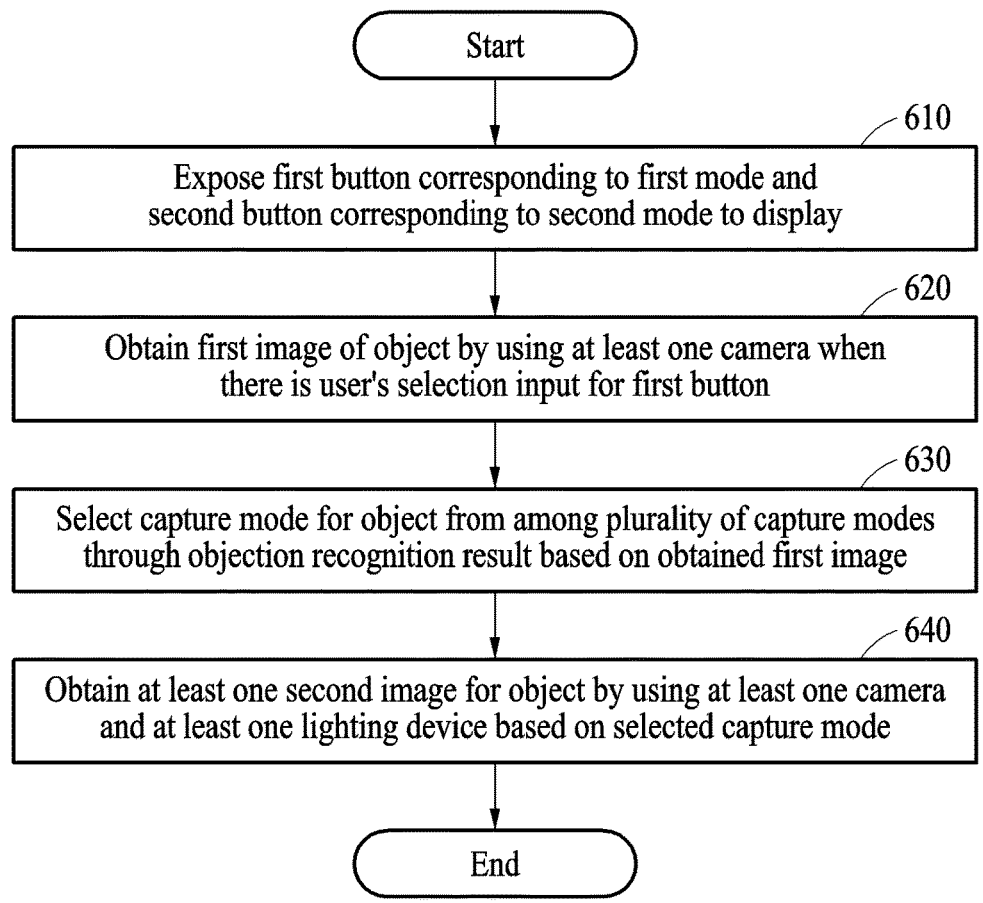
FIG. 6 is a flowchart illustrating an object capturing method according to an example embodiment.

For example, as illustrated in FIG. 5, a capture mode suitable for each object may be registered in advance. As illustrated FIG. 5, a camera position may include a position value (or a coordinate value) of at least one camera capturing each object and a capture option may include a capture option of a camera for capturing each object. In addition, a light intensity may include an intensity value of at least one lighting device used to capture each object and a wavelength may include wavelength (or color temperature) information of the at least one lighting device used to capture each object.

A capture mode for object #1 may include position $information_1$, $option_1$, $intensity_1$, and $wavelength_1$. Although not illustrated in FIG. 5, each capture mode may further include a capturing angle and an illumination angle of the lighting device. The $position\ information_1$ may include a position (or coordinates) of a camera for capturing the object #1. For example, when the object #1 is captured at six positions in the capturing box 110, a characteristic of the object #1 may be well expressed. Such six position values (or coordinate values) may be included in the position $information_1$. $Option_1$ may include a capture option of the camera for capturing the object #1. In this case, the capture option may include, for example, at least one of a shutter speed, an aperture size, sensitivity, auto-focusing, zoom control (e.g., wide-angle, standard, telephoto, and the like), and white balance. The $intensity_1$ may include an intensity value of a lighting device used for capturing the object #1 and the $wavelength_1$ may include a wavelength (or a color temperature) of the lighting device used for capturing the object #1. For example, when six lighting devices are used to capture the object #1, the $intensity_1$ may include the intensity values of each of the six lighting devices and the $wavelength_1$ may include wavelengths of each of the six lighting devices. In this case, the intensity values of the six lighting devices may be the same, different, or partially the same and the wavelengths of the six lighting devices may be the same, different, or partially the same.

As illustrated in FIG. 5, a capture mode for object #2 may include position $information_2$, $option_2$, $intensity_2$, and $wavelength_2$. The $position\ information_2$ may include a position (or coordinates) of a camera for capturing the object #2. For example, the $position\ information_2$ may include four position values (or coordinate values). The $option_2$ may include a capture option of the camera for capturing the object #2. The $intensity_2$ may include an intensity value of a lighting device used to capture the object #2. The $wavelength_2$ may include a wavelength (or a color temperature) of the lighting device used to capture the object #2.

In addition, although not illustrated in FIG. 5, various capture modes suitable for various objects, respectively, may be registered in the object capturing device 100.

In operation 214, the object capturing device 100 may obtain at least one second image of an object by capturing the object based on the selected capture mode.

For example, a camera A that is movable and at least one lighting device may be provided in the capturing box 110. The controller 130 may control the camera A and the at least one lighting device to obtain the second image captured at each coordinate based on the selected capture mode. The controller 130 may move the camera A to each of the coordinates and the at least one lighting device may output light having an intensity and wavelength of the selected capture mode. In this case, an angle in which light illuminates the object may correspond to an illumination angle of the selected capture mode. The camera A may capture the object at each of the coordinates based on the capture option of the selected capture mode. Due to this, the controller 130 may obtain the second image captured at each of the coordinates based on the selected capture mode.

In another example, one fixed camera and at least one lighting device may be provided inside the capturing box 110 and an object may be placed on a rotating plate in the capturing box 110. In this case, the controller 130 may control the camera to capture the object by rotating the rotating plate where the object is placed. Due to this, the controller 130 may obtain the second image captured in various directions.

In another example, one fixed camera and at least one lighting device may be provided in the capturing box 110 and an object may be placed on a fixed plate in the capturing box 110. In this case, the controller 130 may control the camera to capture the object in various directions by rotating the camera. Due to this, the controller 130 may obtain the second image captured in various directions.

In another example, a plurality of cameras and at least one lighting device may be provided in the capturing box 110. In this case, at least one of the plurality of cameras may be fixed and the other cameras may be movable. The controller 130 may control the plurality of cameras and the at least one lighting device to obtain the second image captured at each of the coordinates based on the selected capture mode. In this case, at least one of the coordinates may represent a position of a camera that is fixed. The controller 130 may move a movable camera to coordinates other than coordinates representing the position of a fixed camera and the at least one lighting device may output light satisfying the selected capture mode. Cameras at each of the coordinates may capture the object based on a capture option of the selected capture mode. Due to this, the controller 130 may obtain the second image captured at each of the coordinates based on the selected capture mode. However, this is only an example, and the fixed camera may not be included in the plurality of cameras. In this case, the controller 130 may control each of the cameras to move to each of the coordinates.

In another example, a plurality of cameras and a plurality of lighting devices may be provided in the capturing box 110. Each of the cameras may be fixed and each of the lighting devices may be placed adjacent to each of the cameras. The controller 130 may control the plurality of cameras and the plurality of lighting devices to obtain the second image captured at each of the coordinates based on the selected capture mode. In this case, each of the coordinates may represent a position of a fixed camera. The controller may drive cameras at each of the coordinates. The cameras at each of the coordinates may capture the object and lighting devices adjacent to cameras at each of the coordinates may output light satisfying the selected capture mode. Depending on the selected capture mode, the lighting devices may output light having the same or different wavelengths. Due to this, the controller 130 may obtain the second image captured at each of the coordinates based on the selected capture mode.

In operation 215, the object capturing device 100 may store at least one obtained second image. In operation 215, the object capturing device 100 may post-process (or edit) the at least one second image and may store the post-processed second image and/or an original copy of the second image. Post-processing may include, for example, color correction, white balance correction, trimming, background removal, and the like, but is not limited thereto. According to an example embodiment, it may be configured to capture a color chart. In this case, the original second image may include the object as well as the color chart. The controller 130 may remove the color chart from the original second image. Such a color chart may include an item which may be used as a key to authenticate the capturing box 110 or the object capturing device 100.

In addition, the object capturing device 100 may set a file name of the at least one second image. For example, the controller 130 may use a portion (or all) of an arbitrary serial number or a unique number of the object as the file name of the at least one second image.

In operation 216, the object capturing device 100 may post the second image on a designated online website. For example, the controller 130 may post the at least one second image and an object selling post on a designated online website, such as a designated shopping mall, a second-hand trading website, and the like. Depending on implementation, the controller 130 may transmit the at least one second image to an administrator or a person with a post registration permission of the designated online website. The administrator or the person with a post registration permission of the designated online website may post the second image and the object selling post.

According to an example embodiment, the object capturing device 100 may be connected to a collection box (or an exhibition box). When object capturing is completed, the object capturing device 100 may move the object into the collection box (or the exhibition box). Such movement may be performed by an authorized administrator.

According to an example embodiment, the object capturing device 100 may authenticate a capturing requestor through an authentication procedure and when the authentication is successful, the object capturing device 100 may perform operation 210. The authentication procedure may include, for example, biometrics authentication, identification card authentication, or mobile phone authentication.

FIG. 6 is a flowchart illustrating an object capturing method according to an example embodiment.

Referring to FIG. 6, in operation 610, the object capturing device 100 may expose, on the display 120, a first button corresponding to a first mode and a second button corresponding to a second mode.

In operation 620, when there is a user's selection input for the first button, the object capturing device 100 may obtain a first image of an object by using at least one camera.

In operation 630, the object capturing device 100 may select a capture mode for the object from a plurality of capture modes through an object recognition result based on the obtained first image. The selected capture mode may include camera position information, a capture option, a light intensity, and wavelength information.

In operation 640, the object capturing device 100 may obtain at least one second image of the object by controlling at least one camera and at least one lighting device based on the selected capture mode. The object capturing device 100 may move a camera to capture the object based on camera position information and may set a capture option of the camera to capture the object based on the capture option. In addition, the object capturing device 100 may control the lighting device to capture the object to output light having a light intensity and a wavelength of wavelength information.

Depending on the case, in the case where an image that matches the obtained first image is not stored in a database, in the case where an object recognition model does not view the obtained first image, and in the case where the object does not belong to any of the categories in the second mode described above, object recognition may fail. In other words, the object is not registered. In this case, the object capturing device 100 or the server 310 may obtain information, such as the shape, size, color distribution, color temperature, and reflectivity of the object, through the obtained first image and may recommend an optimal capture option based on the obtained information. The object capturing device 100 may obtain at least one second image of the object by using at least one camera and at least one lighting device based on the recommended capture option.

The description provided with reference to FIGS. 1 through 5 also applies to the description of FIG. 6, and thus, a detailed description thereof is omitted.

The methods according to the above-described examples may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape, optical media such as CD-ROM discs, DVDs, and/or Blue-ray discs, magneto-optical media such as optical discs, and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. An object capturing device comprising:
a capturing box in which at least one camera and at least one lighting device are provided and an object is placed;
a display; and
a controller configured to expose a first button corresponding to a first mode and a second button corresponding to a second mode on the display, in response to a user's selection input for the first button, obtain a first image of the object by controlling the at least one camera, select, if the object is recognized, a capture mode for the object from a plurality of capture modes through an object recognition result based on the obtained first image, obtain at least one second image of the object by controlling the at least one camera and the at least one lighting device based on the selected capture mode, and if the object is not recognized based on the obtained first image, switch from the first mode to the second mode,
wherein the first mode represents a mode that determines a capture mode based on object recognition, and the second mode represents a mode that determines a capture mode based on user input information about the object.

2. The object capturing device of claim 1, wherein the selected capture mode comprises camera position information, a capture option, a light intensity, and wavelength information.

3. The object capturing device of claim 2, wherein the controller is configured to move a camera for capturing the object based on the camera position information, set a capture option of the camera for capturing the object based on the capture option, and control a lighting device for capturing the object to output light of the wavelength information with the light intensity.

4. The object capturing device of claim 2, wherein the capture option comprises at least one of a shutter speed, an aperture size, sensitivity, auto-focusing, zoom, and white balance.

5. The object capturing device of claim 2, wherein the capture option, the light intensity, and the wavelength information are related to a characteristic of the object.

6. The object capturing device of claim 1, wherein the object recognition result corresponds to an object recognized based on a matching rate between the obtained first image and each of prestored images.

7. The object capturing device of claim 1, wherein the controller is configured to, when object recognition based on the obtained first image fails, switch from the first mode to the second mode, and expose a user interface on the display to receive information of the object from the user in the second mode.

8. The object capturing device of claim 1, wherein the controller is configured to perform post-processing on the obtained at least one second image and post the at least one post-processed second image on a predetermined online website.

9. An object capturing method performed by an object capturing device, the object capturing method comprising:
exposing a first button corresponding to a first mode and a second button corresponding to a second mode on the display;
in response to a user's selection input for the first button, obtaining a first image of the object by controlling at least one camera;
selecting, if the object is recognized, a capture mode for the object from a plurality of capture modes through an object recognition result based on the obtained first image;
obtaining at least one second image of the object by controlling the at least one camera and at least one lighting device based on the selected capture mode; and
if the object is not recognized based on the obtained first image, switching from the first mode to the second mode,
wherein the first mode represents a mode that determines a capture mode based on object recognition, and the second mode represents a mode that determines a capture mode based on user input information about the object.

10. The object capturing method of claim 9, wherein the selected capture mode comprises camera position information, a capture option, a light intensity, and wavelength information.

11. The object capturing method of claim 10, wherein the obtaining of the second image comprises moving a camera for capturing the object based on the camera position information, setting a capture option of the camera for capturing the object based on the capture option, and controlling a lighting device for capturing the object to output light of the wavelength information with the light intensity.

12. The object capturing method of claim 10, wherein the capture option comprises at least one of a shutter speed, an aperture size, sensitivity, auto-focusing, zoom, and white balance.

13. The object capturing method of claim 10, wherein the capture option, the light intensity, and the wavelength information are related to a characteristic of the object.

14. The object capturing method of claim 9, wherein the object recognition result corresponds to an object recognized based on a matching rate between the obtained first image and each of prestored images.

15. The object capturing method of claim 9, further comprising:

when object recognition based on the obtained first image fails, switching from the first mode to the second mode; and exposing a user interface on the display to receive information of the object from the user in the second mode.

16. The object capturing method of claim 9, further comprising:

performing post-processing on the obtained at least one second image and posting the at least one post-processed second image on a predetermined online website.

\* \* \* \* \*